(No Model.)
2 Sheets—Sheet 1.
F. L. BOALS.
WINDROWER.
No. 458,093.
Patented Aug. 18, 1891.
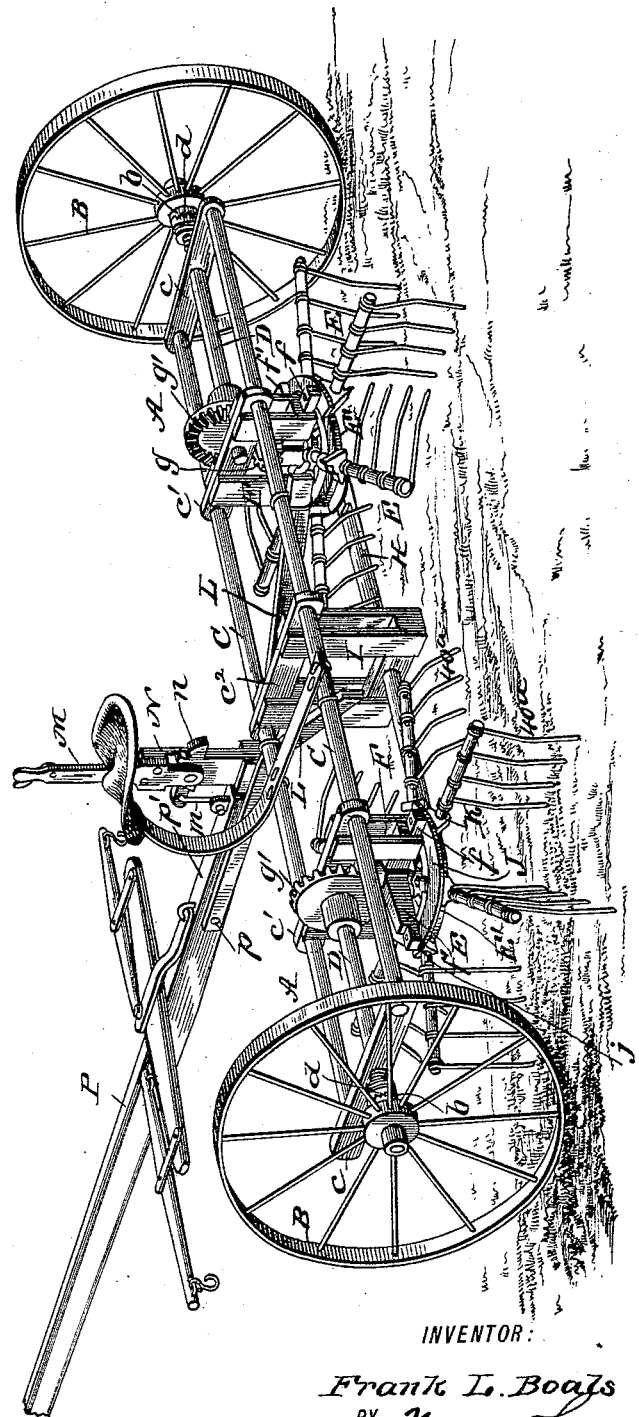
WITNESSES:
Fred G. Dieterich
Jos. A. Ryan
INVENTOR:
Frank L. Boals
BY Munn & Co
ATTORNEYS

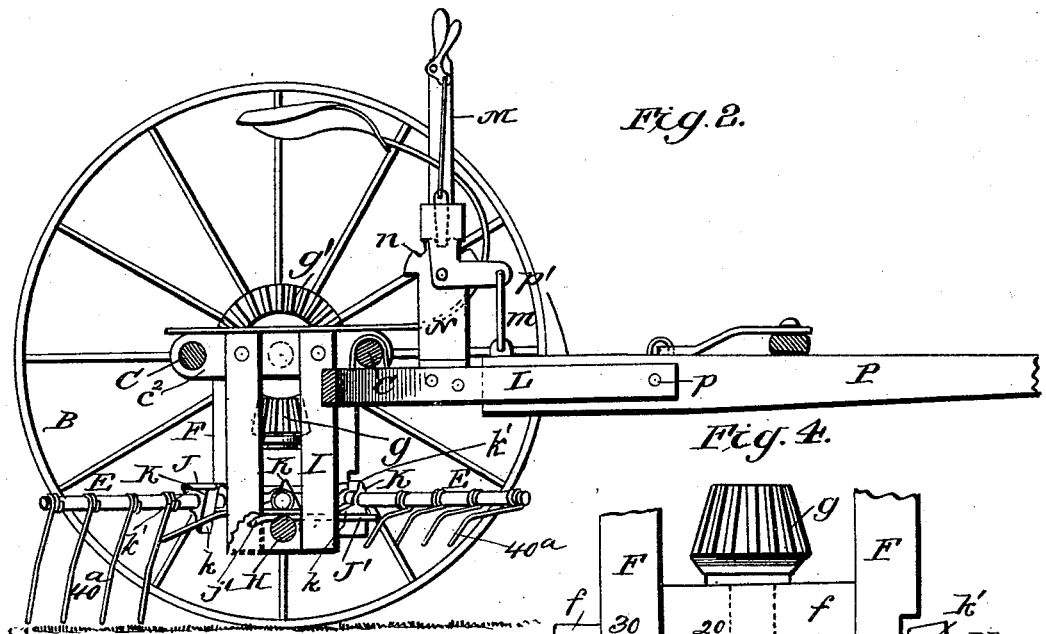

UNITED STATES PATENT OFFICE.

FRANK L. BOALS, OF MANSFIELD, OHIO.

WINDROWER.

SPECIFICATION forming part of Letters Patent No. 458,093, dated August 18, 1891.

Application filed February 18, 1891. Serial No. 381,976. (No model.)

*To all whom it may concern:*

Be it known that I, FRANK L. BOALS, residing in Mansfield, in the county of Richland and State of Ohio, have invented certain new and useful Improvements in Windrowers, of which the following is a specification.

The object of my invention is to provide a machine by which hay or straw may be raked or gathered into a windrow, and it furthermore has for its object to produce a machine of this character which will be simple in its construction, cheap as to cost, easy to manipulate, and effective for its desired purpose.

My invention consists in the novel arrangement and peculiar combination of parts, all of which will be hereinafter fully described in the annexed specification, and particularly pointed out in the claims, reference being had to the accompanying drawings, in which—

Figure 1 is a perspective view of my machine. Fig. 2 is a vertical longitudinal section thereof. Fig. 3 is a top plan view of one of the revolving rakes and its supporting-frame. Fig. 4 is a vertical section on the line 4 4, Fig. 3; and Fig. 5 is a detail view of the cam disks or guides and one of the rake-arms and its cam.

In the accompanying drawings, A indicates the main or supporting frame, which is mounted upon drive-wheels B B, said frame consisting of the longitudinal parallel bars C C, connected at their ends by the cross-pieces $c$ $c$ and intermediate of such ends by the cross-bars $c'$ $c'$ $c^2$, arranged in a manner clearly shown in Fig. 1.

D D indicate the wheel-axles, which are journaled in the end pieces $c$ and cross bars $c'$, such axles being provided with spring-actuated ratchet-hubs $d$, arranged to turn with the axles D in the usual manner and arranged to normally engage with ratchet-hubs $b$, fixedly secured upon the wheels B, which are loosely journaled on the shafts D, said ratchet mechanism serving to operate the rake devices only when the machine travels forward, it being understood that any suitably-arranged shifting-levers may be provided whereby the hubs $b$ and $d$ may be thrown out of operative positions when the machine moves forward, if desired.

E E indicate the revolving rakes, arranged horizontally under the main frame and adjusted to turn in a forward direction when on the inner sides of their axes, each of such rakes being supported in a depending frame F F, secured to the cross-bars $c'$ $c'$, the cross-beam $ff$ of such frames being formed with a central vertical bearing for short vertical shafts G G, the lower ends of which are journaled in the ends $h$ $h$ of a longitudinal bar H, disposed below the rake disks or heads E' and supported in a frame I, hung from the central cross-bar $c^2$, as shown.

Upon the upper end of each of the shafts G is secured a bevel-pinion $g$, which meshes with a bevel gear-wheel $g'$ upon the axles D, whereby motion is transmitted to said shafts G and to the rakes E, which operate in a manner presently described to produce the complete windrow.

By reference to Figs. 3 and 5, which show the construction of the revolving rakes most clearly, it will be seen that each of such rakes is formed of a central disk 20, having a hub portion 10, an annular ring 30, and the spokes 40, connecting the ring and hub portion, said ring being formed with a series of radial apertures $30^a$, in which and in the socket $20^a$ in the disk 20 is journaled the inner ends of a series of radial shafts or rake-heads $40^b$, formed each with a series of rake-teeth $40^a$, as shown.

J J' indicate segmental tracks or guides disposed diametrically opposite to each other concentric to and just outside of the ring 30 and secured to the cross-beam $f$ and the angled portion $f'$ of the depending frame F, as shown, the rear one J of said guides $a'$ arranged over the rake-heads $40^b$, and the other J' below such heads, said segment-guide J being about one-third the circumference of the ring 30 for a purpose presently explained.

Each of the rake-heads $40^b$ is provided with a cam K, which travels between and engages the guides J J' in such a manner that the rake-teeth will be at times turned down, so as to drag the hay toward the center of the machine and then lift to drop such hay when such point is reached.

Each of the cams K, which are fixedly secured to the rake-heads, consists of a triangular body formed with arms $k$ $k'$, arranged as shown.

In operation, when the machine travels forward the rakes revolve in the direction indicated by the arrow in Fig. 3, the forward rakes being held elevated from the ground by means of the cams K engaging the guide J', with their long arms k, their short arms k' projecting up, as shown. Now as the rake-heads revolve the short arms k' of the cams K will strike against the edge j of the upper track J and be turned to a horizontal position to pass under said track J, this movement causing the heads 40ᵇ to make a quarter-turn, thereby turning the rake-teeth down to a vertical position to engage the hay, in which position they will continue for about one-third of the revolution of the revolving rake, when the long arms k of the cams will engage with the downwardly-inclined edge j' (see Fig. 2) of the lower guide-track J' and turn the rake-heads or shafts back again to their previous position, thus lifting the rake-teeth back to a horizontal position. By referring to the drawings it will be observed that the arrangement of the guides J J' is such that the rake heads or shafts 40ᵇ will be turned to bring the teeth down to a point under the axles and raise them at a point just in advance of the lower longitudinal bar H. The said teeth in passing over said bar engage it and have all the hay that remains hung to them removed, thereby being thoroughly cleaned before they in their revolution are dropped in position to again drag.

L L indicate the tongue-supports, which diverge at their rear ends and extend under and are secured to the bars C C, as shown, the tongue P having a pivoted connection between the said bars at p, the rear end p' being connected by means of the link m with the tilting lever M, pivoted on a standard N, held between the tongue-supports L and formed with a toothed segment n, as shown, with which the locking-dog of the lever engages, such lever being arranged convenient to the driver's seat, as shown.

From the foregoing description, taken in connection with the drawings, it will be readily understood that when the machine travels forward the rakes will revolve toward each other and windrow two mower-swaths at one time and at once making a complete windrow.

By arranging the revolving rakes so as to operate independent and toward each other I facilitate the operation of forming a complete windrow, thereby rendering it possible to windrow the mowed hay in a much less time than it can be done by the old methods, it doing the work so completely that no other labor will be necessary to clean up and finish the rows ready for the loader.

Having thus described my invention, what I claim, and desire to secure by Letters Patent, is—

1. A windrower comprising a main frame, supporting-wheels independently journaled thereon, a pair of horizontally-arranged revolving rake-frames provided with a series of radial shafts or arms carrying sweeping-teeth, said arms and teeth arranged to successively engage and sweep the hay toward each other and then raise from contact therewith, and means, substantially as shown, for revolving said rakes on the forward movement of the machine, substantially as and for the purpose described.

2. In a windrower, the combination of a horizontal revoluble circular disk, shafts projecting radially from said disk, raking-teeth attached to said shafts, and devices, substantially as described, for operating said tooth-shafts to first bring the teeth to the ground, then lift them from the ground, and then clean them, as and for the purposes specified.

3. In a windrower, the combination, with the main frame and the supporting-wheels independently journaled thereon, of the revoluble rake-frame supported below the main frame, such rake-frames consisting each of a central disk mounted to turn with a vertical shaft geared with the drive-wheel axle, shafts projected radially from said disk, having cams and sweeping-teeth secured thereto, and the segmental fixed guides arranged, as shown, to alternately engage said cams on the tooth-shafts to lower and elevate the sweeping-teeth, substantially as shown, and for the purpose described.

4. In a windrower, the combination, with the main frame, the end depending frames F, the central depending support I, and the central longitudinal bar H, hung in said central support I and extending under the end frames F F, of the revoluble circular rake-disks provided with partially-rotatable shafts projected radially from the disks and carrying sweeping-teeth, said teeth in their forward movement adapted to engage the bar H and be cleaned thereby, substantially as and for the purpose described.

5. In a windrower, a horizontal revolvuble circular tooth-carrying frame consisting of a central disk, a series of radially-projecting partially-rotatable shafts journaled at their inner ends in said disk and provided near their bearing-points with cams and with sweeping-teeth, as shown, in combination, with the segmental guides J J', arranged one J under the other J' above the cams, their adjacent ends arranged in a manner whereby said cams will engage the upper guide and be partially turned to bring the teeth to the ground and as they leave said guide engage the lower guide, and thereby turn the shafts back again to elevate the teeth, substantially as and for the purpose described.

FRANK L. BOALS.

Witnesses:
JAMES P. SEWARD,
DAVID BRICKER.